(12) United States Patent
Honbo et al.

(10) Patent No.: US 7,123,323 B2
(45) Date of Patent: Oct. 17, 2006

(54) LIQUID CRYSTAL DISPLAY DEVICE WITH CONDUCTIVE LIGHT SHIELDING FILM AND CONTACT HOLES

(75) Inventors: Nobuaki Honbo, Tokyo (JP); Kazuhide Yoshinaga, Tokyo (JP); Hiroyuki Sekine, Tokyo (JP)

(73) Assignee: NEC Corporation, Tokyo (JP)

( * ) Notice: Subject to any disclaimer, the term of this patent is extended or adjusted under 35 U.S.C. 154(b) by 1124 days.

(21) Appl. No.: 09/828,863

(22) Filed: Apr. 10, 2001

(65) Prior Publication Data

US 2002/0008814 A1 Jan. 24, 2002

(30) Foreign Application Priority Data

Apr. 11, 2000 (JP) .......................................... 2000-109692
Mar. 7, 2001 (JP) .......................................... 2001-063828

(51) Int. Cl.
*G02F 1/1343* (2006.01)

(52) U.S. Cl. .......................................... 349/111; 349/44
(58) Field of Classification Search ................... 349/44, 349/111
See application file for complete search history.

(56) References Cited

FOREIGN PATENT DOCUMENTS

| JP | 1-128534 | 5/1989 |
|----|----------|--------|
| JP | 1-177020 | 7/1989 |
| JP | 8-62579 | 3/1996 |
| JP | 8-234239 | 9/1996 |
| JP | 10-301100 | 11/1998 |
| JP | 11-183934 | 7/1999 |
| JP | 11-337900 | 12/1999 |
| JP | 2000-010120 | 1/2000 |
| JP | 2000-010121 | 1/2000 |
| JP | 2000-056319 | 2/2000 |
| JP | 2000-91581 | 3/2000 |
| JP | 2000-098409 | 4/2000 |
| JP | 2000-356787 | 12/2000 |
| JP | 2001-177102 | 6/2001 |
| KR | 1998-071672 | 10/1998 |

OTHER PUBLICATIONS

Korean Office Action dated Apr. 28, 2003, with Japanese and partial English translations.
Japanese Notice of Reasons of Revocation on Sep. 19, 2003.

*Primary Examiner*—Robert H. Kim
*Assistant Examiner*—Andrew Schechter
(74) *Attorney, Agent, or Firm*—McGinn & Gibb, PLLC

(57) ABSTRACT

In a liquid crystal display device having a pixel board on which light shielding film 3, first insulating film 10, semiconductor layer, second insulating film 11 serving as a gate insulating film and gate wires 4 are formed, a source region, a drain region and a channel region or both of a channel region and LDD (Light doped drain) region being formed in the semiconductor layer, the light shielding film 3 is made of a conductive material, and contact holes 6 for connecting each gate line and the light shielding film are provided in the neighborhood of the side surface of the channel region or/and the LDD region.

19 Claims, 14 Drawing Sheets

RELATED ART

RELATED ART

LIQUID CRYSTAL DISPLAY DEVICE WITH CONDUCTIVE LIGHT SHIELDING FILM AND CONTACT HOLES

BACKGROUND OF THE INVENTION

1. Field of the Invention

The present invention relates to a liquid crystal display device and a liquid crystal projector apparatus and, particularly a liquid crystal display device having a pixel board on which a light shielding film, a first insulating film, a semiconductor layer, a second insulating film serving as a gate insulating film and gate lines are formed, a source region, a drain region and a channel region or both of a channel region and LDD (Light doped drain) region being formed in the semiconductor layer, and a liquid crystal projector apparatus using the liquid crystal display device.

2. Description of the Related Art

Japanese Patent Application No. Hei-11-109979 discloses a pixel structure as a light shielding mechanism of liquid crystal light valve. FIG. 1 is a plan view showing a pixel TFT portion disclosed in Japanese Patent Application No. Hei-11-109979, and FIG. 2 is a cross-sectional view taken along a line E–E' of FIG. 1.

As shown in FIGS. 1 and 2, ground film (ground insulating film) 14, back side light shielding film 3, first interlayer film 10, a semiconductor layer, gate insulating film 11, gate line 4, second insulating film 12, data line 5, third insulating film 13, black matrix 9 are formed on glass substrate 15. A source region, a drain region, channel region 1 and LDD region 2 are formed in the semiconductor layer.

As shown in FIG. 1, gate lines 4 and data lines 5 are arranged in a matrix form so as to be perpendicular to each other, and each pixel TFT is disposed at the intersecting portion between each gate line 4 and each data line 5. As shown in the cross-sectional view of FIG. 2, dummy contact hole 20 which does not reach a back side light shielding film 3 is formed in the neighborhood of the side surface of the LDD region 2 of each TFT. A gate line material is filled in the dummy contact hole 20. The dummy contact hole 20 serves to reduce light irradiated to the LDD region 2 of TFT. The potential of the back side light shielding film 3 is set to the ground (GND) potential so that the back side light shielding film 3 is prevented from acting as a back gate of TFT. The source region of TFT is connected to data line 5 through contact hole 7. The drain region of TFT is connected to a transparent pixel electrode ITO through contact hole 8.

Japanese Patent Application No. Hei-11-360973 discloses another pixel structure for the pixel light shielding mechanism of liquid crystal light valve. FIG. 3 is a plan view showing a pixel disclosed in Japanese Patent Application No. Hei-11-360973, and FIG. 4 is a cross-sectional view taken along a line F–F' of FIG. 3. In FIGS. 3 and 4, when the function of the constituent member is the same as that of FIGS. 1 and 2, the same sign is put.

In the pixel structure of Japanese Patent Application No. Hei-11-360973, a contact hole 18 which reaches back side light shielding film 3 is formed at each of both the sides of TFT, and it is covered by aluminum wire 5 serving as a data line. The light 16' irradiates to the contact holes 18. The TFT is shielded from the light by the contact holes 18. Side wall 19 is formed on the wall of the contact holes 18. Poly-Si (polysilicon) 21 is formed on ground film 14.

Japanese Laid-open Patent Publication Nos. Hei-1-128534, Hei-1-177020, Hei-8-62579 and Hei-8-234239 disclose techniques relating to the present invention. Particularly, Japanese Laid-open Patent Publication No. Hei-8-234239 discloses that a light shielding pattern and a gate wiring pattern are electrically connected to each other through a contact portion.

The structure of the Japanese Patent Application No. Hei-11-109979 cannot perfectly shield TFT from light irradiated to TFT, and thus it is difficult to prevent degradation in image quality due to optical leak current of TFT. Further, when the wire resistance of the gate lines is high, there occurs degradation in image quality due to delay of gate signals.

Further, the structure of Japanese Patent Application No. Hei-11-360973 can shield TFT from light irradiated to TFT, however, when the resistance of the gate lines is high, degradation in image quality due to the delay of the gate signals occurs.

The cause of the degradation in image quality will be described in detail.

In the pixel structure of the Japanese Patent Application No. Hei-11-109979, dummy contact holes which do not reach the back side light shielding film are formed at both the sides of the LDD region of TFT, and thus a gap occurs between the back side light shielding film and each dummy contact hole. Therefore, TFT cannot be perfectly shielded from light irradiated thereto.

In general, when a panel is designed in a compact size and the width of the wires is small, the wire resistance is increased. The embodiments disclosed in the Japanese Laid-open Patent Application Nos. Hei-11-109979 and Hei-11-360973 use WSi for the gate lines and aluminum wires for the data lines. WSi is higher in resistance than aluminum. Therefore, when the wire resistance is increased due to compact design of panels, the delay of the gate signals is also increased, and degradation in image quality due to this delay occurs.

SUMMARY OF THE INVENTION

According to a first aspect of the present invention, there is provided a liquid crystal display device comprising a pixel board on which a light shielding film, a first insulating film, a semiconductor layer, a second insulating film serving as a gate insulating film and gate lines are formed, a source region, a drain region and a channel region or both of a channel region and LDD region being formed in the semiconductor layer, wherein the light shielding film is made of a conductive material, and contact holes for connecting each gate line and the light shielding film are provided in the neighborhood of the side surface of the channel region or/and the LDD region.

According to a second aspect of the present invention, there is provided A liquid crystal display device comprising a pixel board on which a light shielding film, a first insulating film, a semiconductor layer, a second insulating film serving as a gate insulating film, gate lines, a third insulating film and data lines are formed, a source region, a drain region and a channel region or both of a channel region and LDD region being formed in the semiconductor layer, wherein the light shielding film is made of a conductive material, and contact holes for connecting to light shielding film are provided below each data line.

According to a third aspect of the present invention, there is provided a liquid crystal projector apparatus which includes the liquid crystal display device of the first or second aspect of the present invention, a light source for irradiating light to the liquid crystal display device, an optical system for guiding the light form the light source to the liquid crystal display device, and an optical system for projecting information light from the liquid crystal display device.

The feature of the present invention resides in that in the structure of a pixel TFT used in a liquid crystal display device such as a liquid crystal light valve or the like, contact holes for connecting a back side light shielding film and a gate line are formed in the neighborhood of the side surface of a channel region or/and LDD (Light doped drain) of the pixel TFT, and light irradiated to TFT is reduced by using the contact holes as a light shielding region, thereby suppressing the optical leak current of TFT. In addition, the wire resistance of the gate wires is reduced by using the back side light shielding film as the gate wires.

Further, the feature of the present invention resides in that the light propagating along the data line is intercepted by the contact holes provided below the data line and the light irradiated to TFT is reduced, thereby suppressing the optical leak current of TFT.

BRIEF DESCRIPTION OF THE PREFERRED EMBODIMENTS

DETAILED DESCRIPTION OF THE PREFERRED EMBODIMENTS

Preferred embodiments according to the present invention will be described hereunder with reference to the accompanying drawings.

Figure 5:
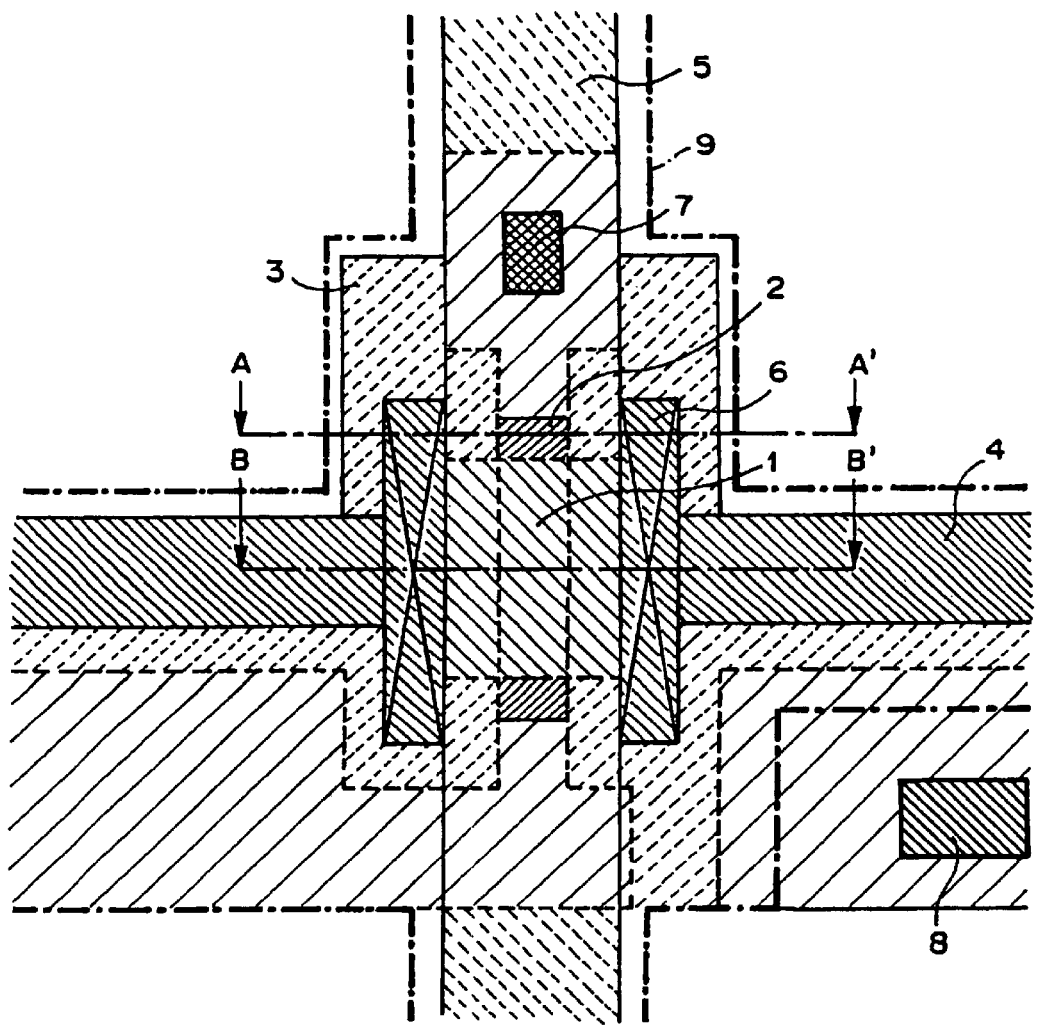
FIG. 5 is a plan view showing a pixel TFT portion of a liquid crystal light valve according to a first embodiment of the present invention.
Figure 6:
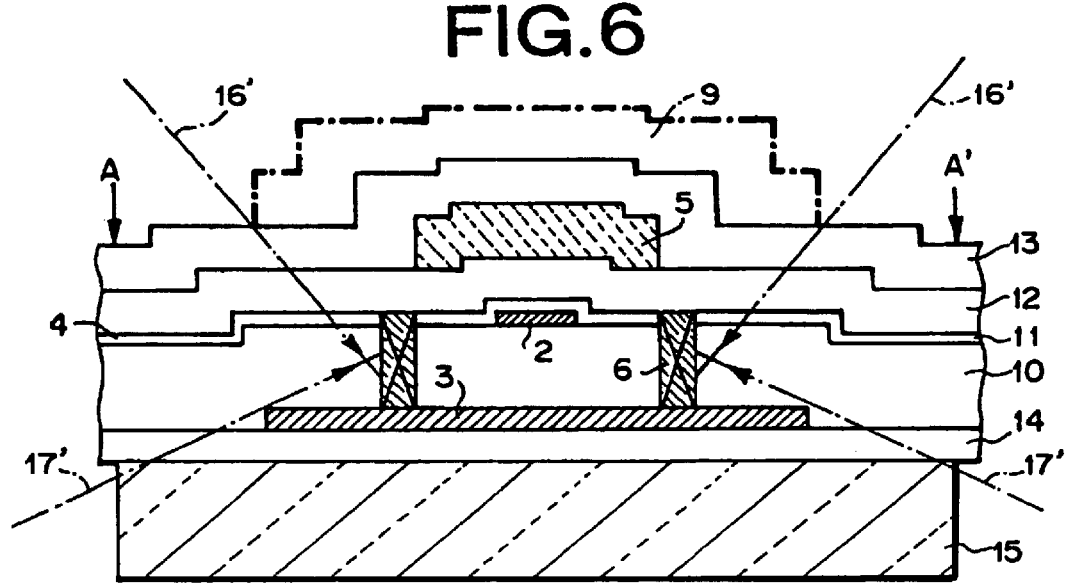
FIG. 6 is a cross-sectional view taken along a line A–A of FIG. 5 and a line D–D' of FIG. 9.
Figure 7:
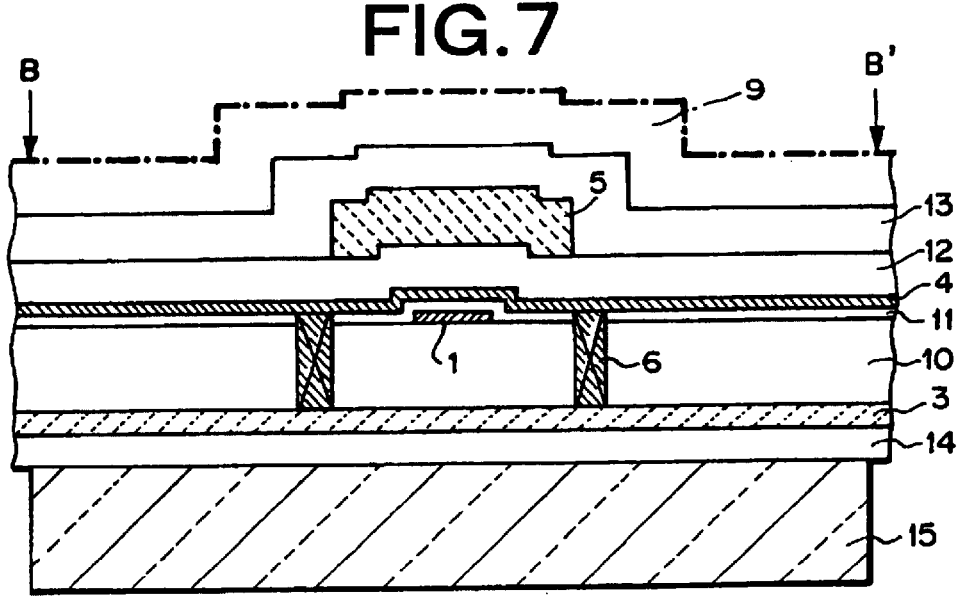
FIG. 7 is a cross-sectional view taken along a line B–B' of FIG. 5.

FIG. 5 shows the pixel structure of a liquid crystal light valve according to the present invention. Contact holes 6 for connecting back side light shielding film 3 and gate line 4 to each other are formed in the neighborhood of the side surfaces of channel region 1 and LDD region 2 of TFT. FIG. 6 is a cross-sectional view taken along a line A–A' of FIG. 5 and FIG. 7 is a cross-sectional view taken along a line B–B' of FIG. 5. As shown in FIG. 7, gate line material is filled in the contact holes 6 provided in the neighborhood of the side surface of TFT.

Figure 2:
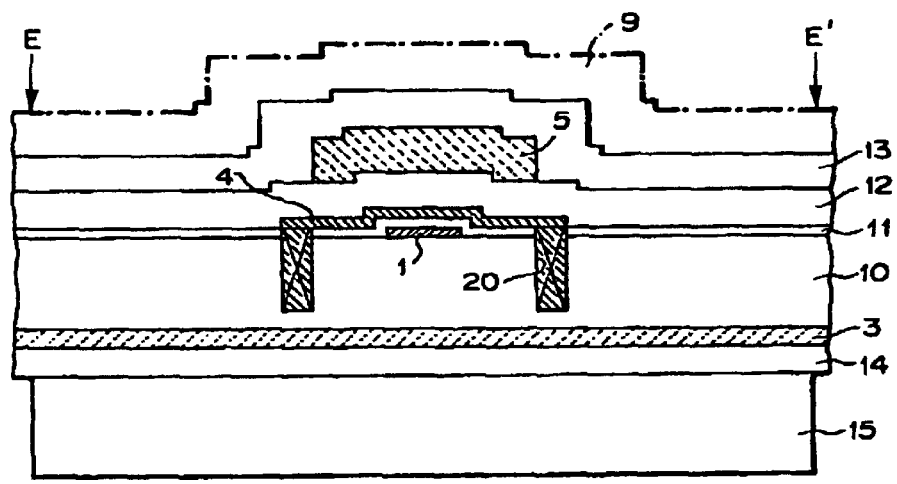
FIG. 2 is a cross-sectional view taken along a line E–E' of FIG. 1.
Figure 9:
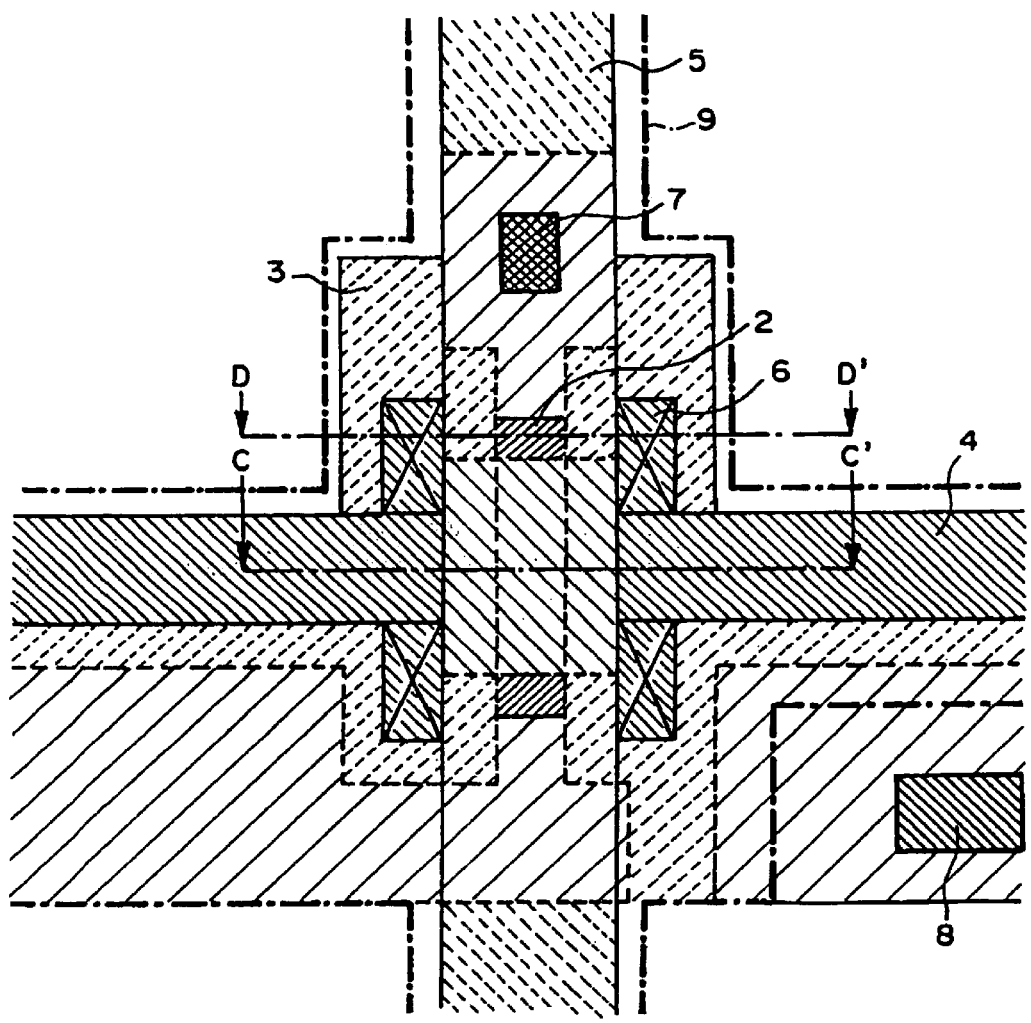
FIG. 9 is a plan view showing the pixel TFT portion of a liquid crystal light valve according to a second embodiment of the present invention.

FIG. 9 shows another pixel structure of another liquid crystal light valve of the present invention. In FIG. 9, contact holes 6 for connecting back side light shielding film 3 and gate line 4 to each other are formed in the neighborhood of the side surface of an LDD region of TFT. The cross-sectional structure along a line D–D' of FIG. 9 is the same as cross-sectional structure shown in FIG. 2. As shown in FIG. 2, gate line material is filled in the contact holes 6 provided in the neighborhood of the side surface of LDD of TFT.

The contact holes provided in the neighborhood of the side surface of TFT serve to prevent the direct incident light from a light source and the reflection light reflected from a lens from being incident to the channel region and the LDD region of the pixel TFT. The back side light shielding film is connected to the gate line by the contact holes and thus the back side light shielding film serves as a gate wire.

That is, the light irradiated to TFT can be reduced by the contact holes provided in the neighborhood of the side surface of the pixel TFT, so that the optical leak current of TFT can be suppressed. Further, the back side light shielding film serves as the gate wire and thus the delay time of the gate signal can be reduced. Accordingly, reduction of flicker contrast, etc. which are caused by the optical leak current of TFT can be prevented, and also degradation in image quality due to the delay of the gate signal can be prevented.

Figure 11:
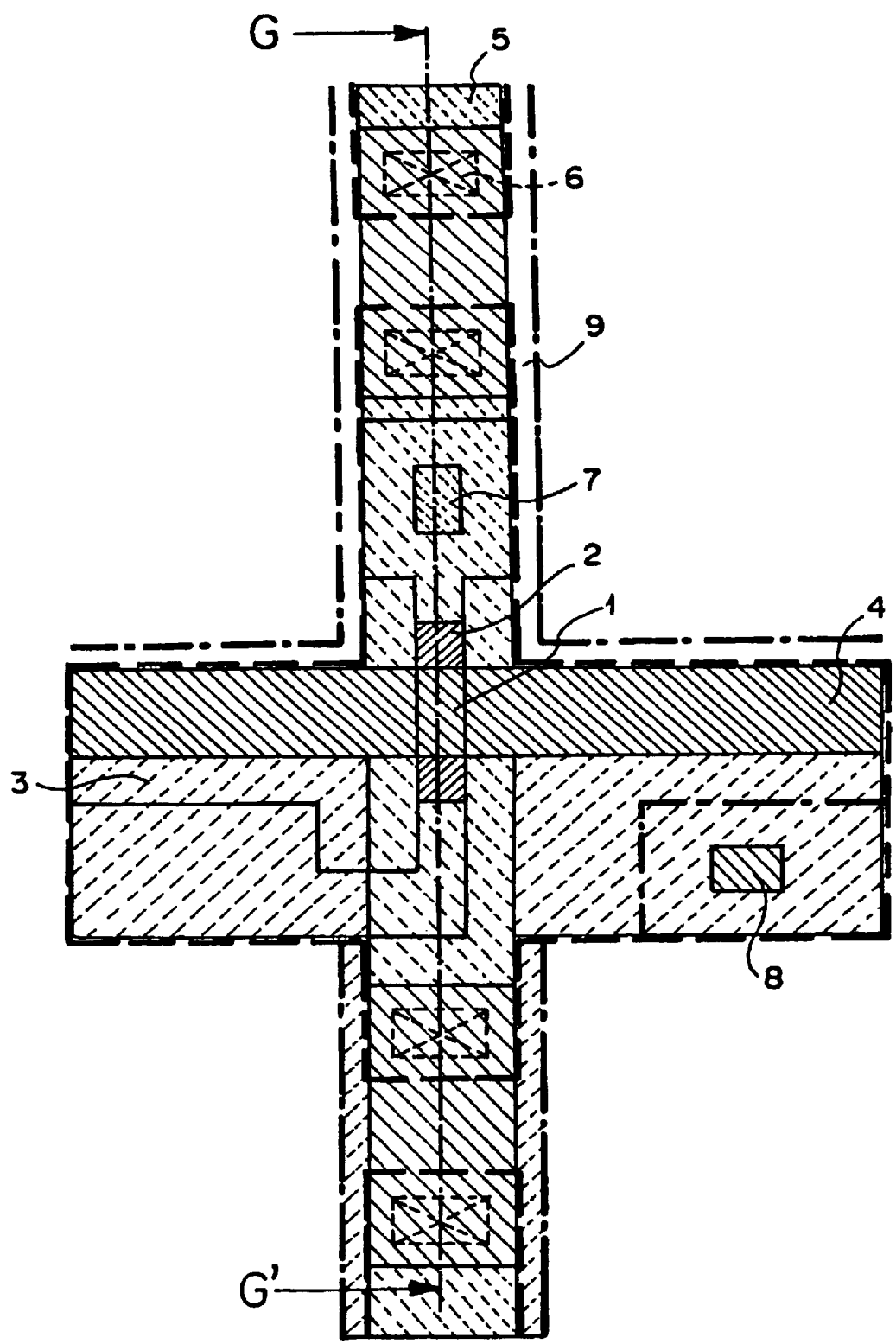
FIG. 11 is a plan view showing a pixel TFT portion of a liquid crystal light valve according to a third embodiment of the present invention.

FIG. 11 shows another pixel structure of another liquid crystal light valve of the present invention. In FIG. 11, the light propagating along the data line 5 is intercepted by the contact holes 6 provided below the data line 5 and the light irradiated to TFT is reduced, thereby suppressing the optical leak current of TFT.

Next, preferred embodiments according to the present invention will be described in more detail with reference to the accompanying drawings.

First Embodiment

Figure 1:
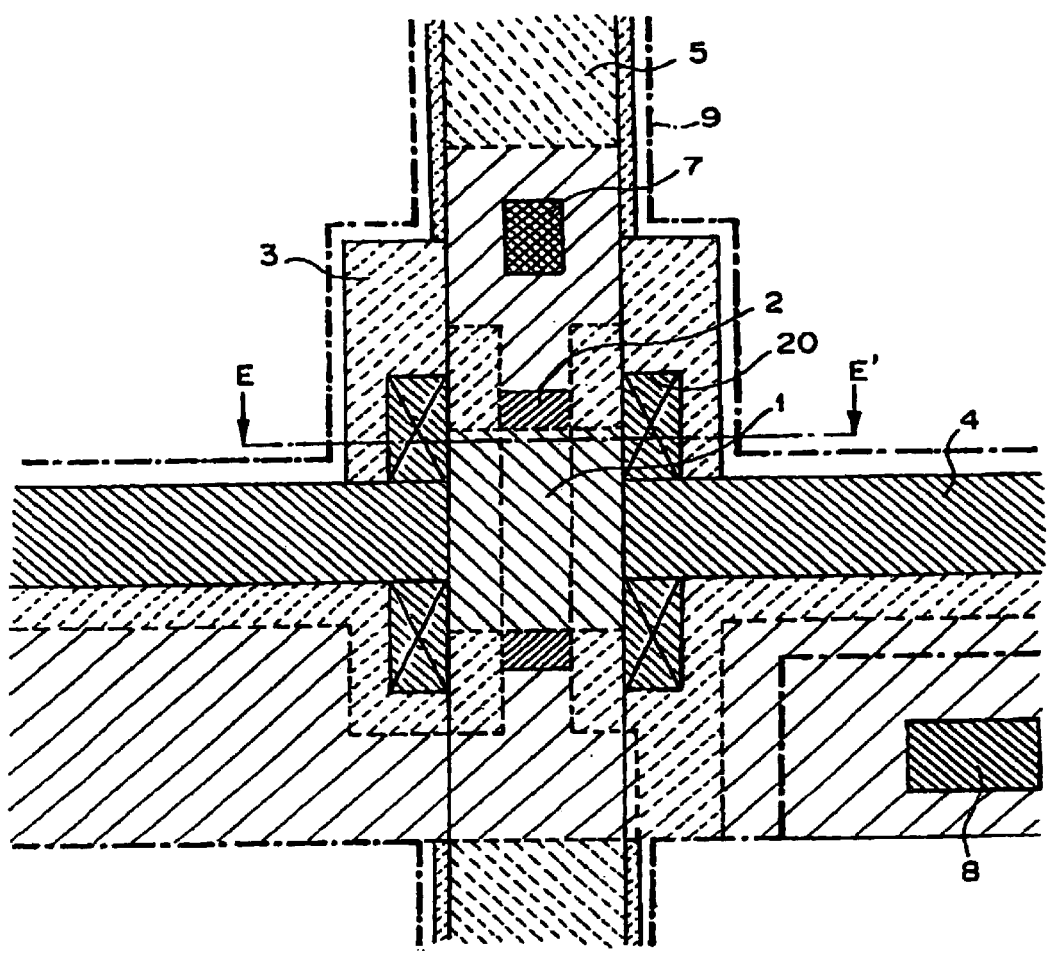
FIG. 1 is a plan view showing a first related art.
Figure 3:
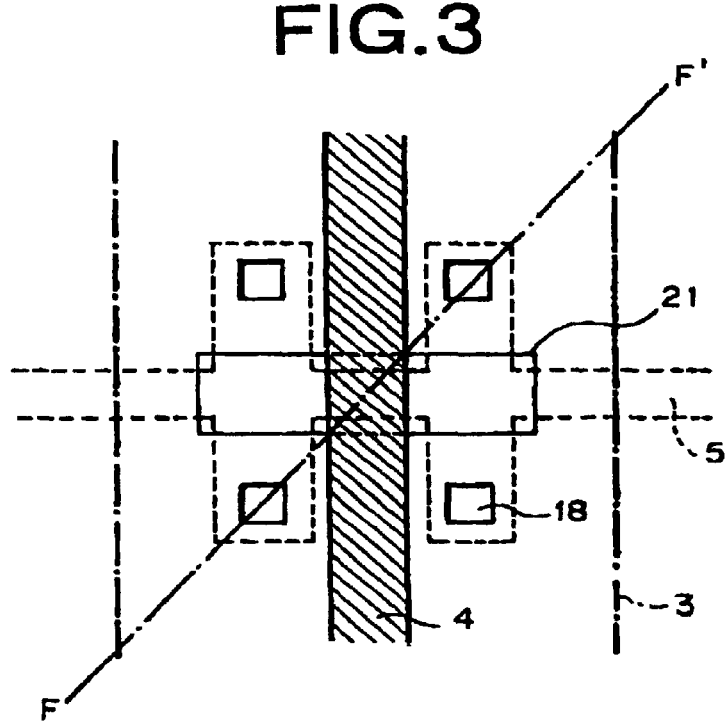
FIG. 3 is a plan view showing a second related art.
Figure 4:
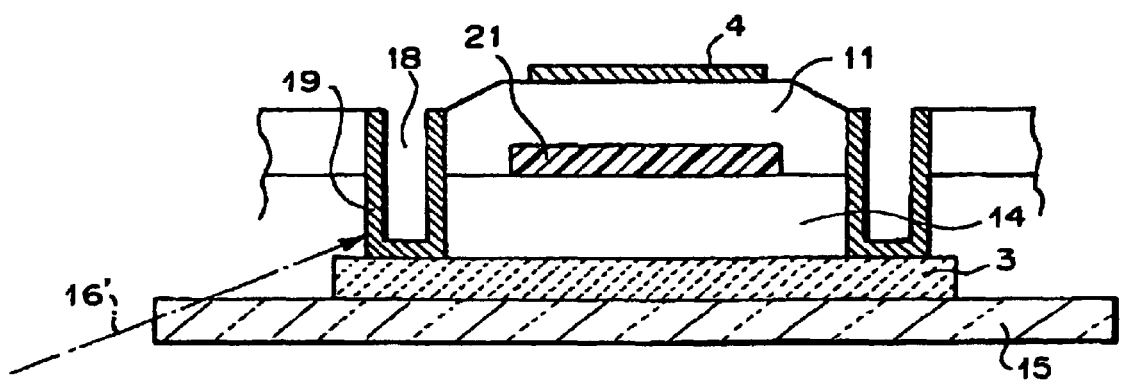
FIG. 4 is a cross-sectional view taken along a line F–F' of FIG. 3.

FIG. 5 is a plan view showing a pixel TFT portion of a liquid crystal light valve according to a first embodiment of the present invention, and FIGS. 6 and 7 are cross-sectional views taken along a line A–A' and a B–B' line of FIG. 1. In FIGS. 5 to 7, when the function of the constituent member is the same as that of FIGS. 1 and 2, the same sign is put. In FIGS. 1, 2 and 3, only the TFT portion of a pixel on a pixel board is shown. However, a plurality of pixels are arranged in a matrix form on the pixel board, and the pixel board having these pixels formed thereon and a counter board having a counter electrode are arranged so as to face each other through liquid crystal, thereby fabricating the liquid crystal light valve.

As shown in FIGS. 5 to 7, ground film (ground insulating film) 14, back side light shielding film 3, first interlayer film 10, a semiconductor layer, gate insulating film 11, gate line 4, second insulating film 12, data line 5, third insulating film 13, black matrix 9 are formed on glass substrate 15. A source region, a drain region, channel region 1 and LDD region 2 are formed in the semiconductor layer. The source region of TFT is connected to data line 5 through contact hole 7. The drain region of TFT is connected to a transparent pixel electrode ITO through contact hole 8.

The manufacturing flow until data lines are formed are shown in FIGS. 8A to 8I.

Figure 8A:
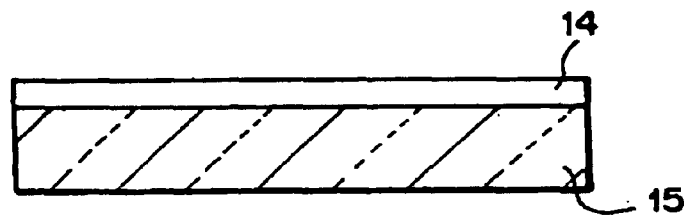
FIGS. 8A to 8I are cross-sectional views showing a manufacturing flow until a data line forming step of the pixel TFT portion according to the first embodiment of the present invention.
Figure 8B:
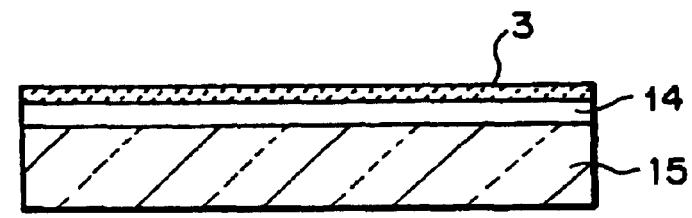
Figure 8C:
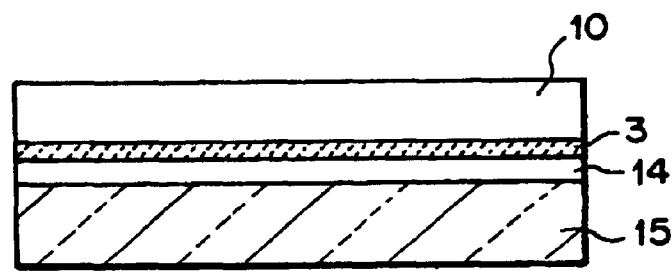
Figure 8D:
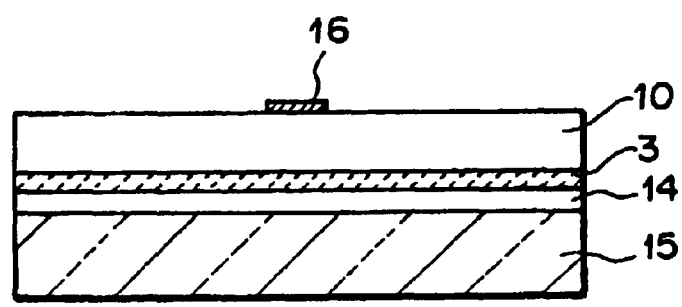
Figure 8E:
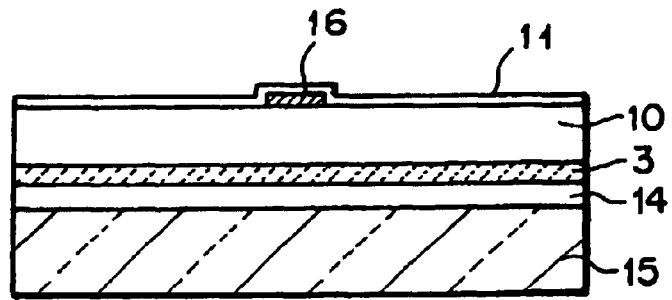

As shown in FIG. 8A, a ground film (ground insulating film) 14 is formed (made) of $SiO_2$ or the like on a glass substrate 15 to prevent contamination of impurities from glass. Subsequently, as shown in FIG. 8B, back side light shielding film 3 of TFT is formed on the ground film 14. Any material may be used for the back side light shielding film 3 insofar as it can intercept light, however, highly heat-resistant material such as WSi or the like is preferable used because it is subjected to an annealing treatment when polysilicon is formed. Subsequently, as shown in FIG. 8C, a first interlayer film 10 is formed of $SiO_2$ or the like on the back side light shielding film 3. The thickness of the first interlayer film 10 is determined so that the back side light shielding film 3 does not act as a back gate of TFT. Subsequently, polysilicon layer 16 is formed as shown in FIG. 8D. After an amorphous silicon layer is formed, a laser annealing treatment is applied, and then a photolithographic treatment and an etching treatment are carried out to form the polysilicon layer 16. Thereafter, gate insulating film 11 is formed to cover the polysilicon layer 16 as shown in FIG. 8E.

Figure 8F:
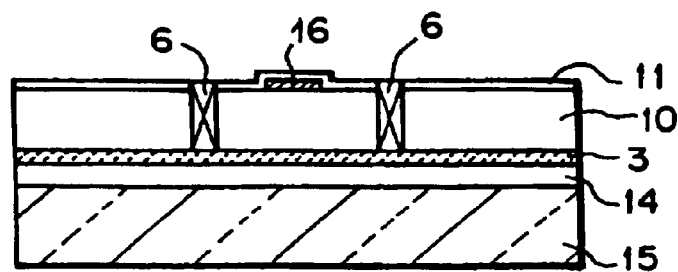
Figure 8G:
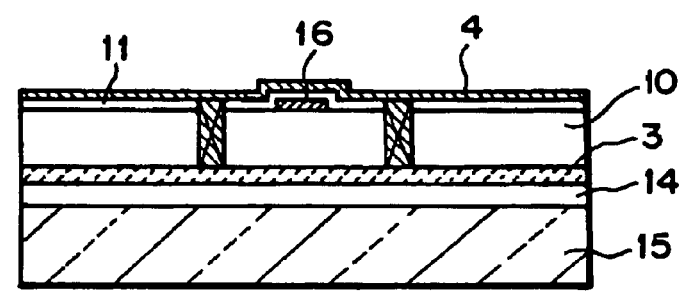

Subsequently, contact holes (contacts) 6 are formed in the neighborhood of the side surface of TFT as shown in FIG. 8F, and then a metal film of WSi or the like which serves as gate line 4 is formed as shown in FIG. 8G. Therefore, the gate metal film is embedded in the contact holes 6 in the neighborhood of the side surface of TFT. Since the contact holes 6 are formed along a channel region and an LDD (Light doped drain) region of TFT, the channel region and the LDD region are finally covered by the contact holes, the gate line and the back side light shielding film after a patterning treatment for the gate line is carried out.

Figure 8H:
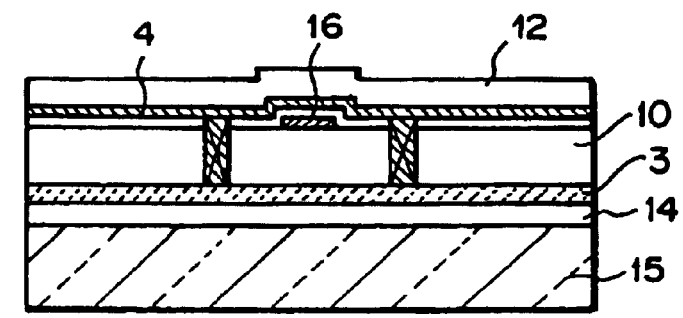
Figure 8I:
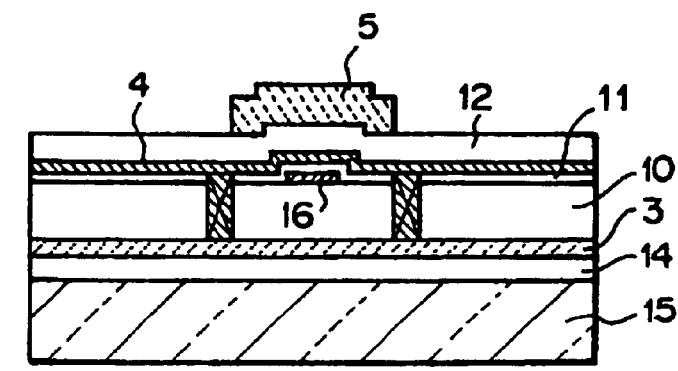

Thereafter, impurities are doped to form a source region, a drain region and LDD region. Subsequently, a second interlayer film 12 is formed as shown in FIG. 8H. Thereafter, contact holes for connecting the gate electrode and the polysilicon layer to the gate line and the data line respectively are formed, and a metal material such as aluminum or the like which serves as the data line 5 is formed and patterned as shown in FIG. 8I. Thereafter, a third interlayer film 13, a metal material serving as a black matrix 9, a fourth interlayer film and a transparent pixel electrode ITO are successively formed in this order.

The cross-sectional shape as shown in FIGS. 6 and 7 are obtained through the above process. FIGS. 6 and 7 are cross-sectional views which are taken at the LDD portion (A–A' section) and at the channel portion (B–B' section) of TFT of FIG. 5, respectively. As shown in FIGS. 6 and 7, the LDD region and the channel region of TFT are covered by the contact holes, the gate line and the back side light shielding film. The back side light shielding film is brought into contact with the gate line by the contact holes in the neighborhood of the side surface of TFT.

In a liquid crystal projector using the liquid crystal light valve having the pixel TFT portion thus constructed, not only direct light from a light source, but also strong light such as reflection light from the back surface are irradiated to the liquid crystal light valve. Therefore, light is irradiated to the channel region or the LDD portion of the pixel TFT of the light valve directly or with repetitive reflection.

However, according to this embodiment, the contact holes for connecting the gate line and the back side light shielding film are formed in the neighborhood of the side surfaces of the channel region and the LDD region of TFT, so that the direct light 16' from the light source and the reflection light 17' from the lens are intercepted by these contact holes as shown in FIGS. 6 and 7, thereby shielding TFT from the light.

Further, the back side light shielding film is brought into contact with the gate line by the contact holes, so that the back side light shielding film intercepts the light from the back surface of TFT and also serves as a gate wire, thereby reducing the wire resistance of the gate line. The back side light shielding film has an effect on the TFT operation as a back gate when the distance between the back side light shielding film and TFT is small. However, when the back side light shielding film is spaced from TFT at some distance, it has no effect on the TFT operation even when it is set to any potential.

As described above, according to this embodiment, the light incident to the TFT channel portion and the LDD portion can be intercepted. Accordingly, the optical leak current of the pixel TFT can be reduced, thereby preventing the reduction of the contrast due to the optical leak current and the degradation in image quality due to flicker or the like. Further, the wire resistance of the gate wire can be reduced, thereby preventing the degradation in image quality due to delay of signals of the gate line.

Second Embodiment

Figure 10:
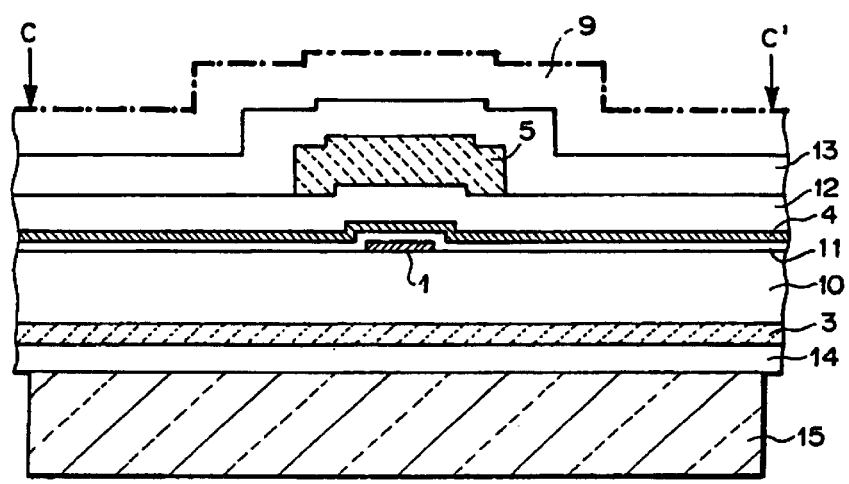
FIG. 10 is a cross-sectional view taken along a line C–C' of FIG. 9.

FIG. 9 is a plan view showing a pixel TFT portion of a liquid crystal light valve according to a second embodiment of the present invention, and FIG. 10 is a cross-sectional view taken along a line C–C' of FIG. 9. The cross-sectional view taken along a line D–D' of FIG. 9 is the same as FIG. 6. In FIGS. 9 and 10, when the function of the constituent member is the same as that of FIG. 5 to FIG. 7, the same sign is put.

In FIGS. 9 and 10, only the TFT portion of one pixel on the pixel board which is the feature portion of the present invention is illustrated. However, a plurality of pixels are arranged in a matrix form on the pixel board, and the pixel board thus constructed and a counter board having a counter electrode formed thereon are arranged so as to face each other through liquid crystal, thereby fabricating a liquid crystal light valve.

The manufacturing flow until the data line is formed is the same as that shown in FIGS. 8A to 8I. The manufacturing flow will be described with reference to FIGS. 8A to 8I.

As shown in FIG. 8A, ground film (ground insulating film) 14 is formed of $SiO_2$ or the like on glass substrate 15 to prevent contamination of impurities from the glass. Subsequently, back side light shielding film 3 of TFT is formed on the ground film 14 as shown in FIG. 8B. Any material may be used as the material of the back side light shielding film 3 insofar as it can intercept light, however, a material having high resistance to heat such as WSi or the like is preferably used because an annealing treatment is carried out when polysilicon is formed. Subsequently, as shown in FIG. 8C, first interlayer film 10 of $SiO_2$ or the like is formed on the back side light shielding film 3. The first interlayer film 10 is formed at such a thickness that the light side light shielding film 3 does not act as a back gate of TFT. Subsequently, polysilicon layer 16 is formed as shown in FIG. 8D. After an amorphous silicon layer is formed, a laser annealing treatment is applied, and further a photolithographic step and an etching step are executed to form the polysilicon layer 16. Subsequently, as shown in FIG. 8E, a gate insulating film 11 is formed so as to cover the polysilicon layer 16.

Subsequently, contact holes 6 are formed in the neighborhood of the side surface of the LDD region of TFT as shown in FIG. 8F, and a metal film of WSi or the like which will serve as a gate line 4 is formed as shown in FIG. 8G. Therefore, the gate metal film is embedded in the contact holes in the neighborhood of the side surface of the LDD region of TFT. Since the contact holes 6 are formed along the LDD region of TFT, the LDD region are covered by the contact holes, the gate line and the back side light shielding film after the patterning treatment of the gate line is carried out.

Thereafter, impurities are doped to form a source region, a drain region and LDD region. Subsequently, second interlayer film 12 is formed as shown in FIG. 8H. Subsequently, contacts for connecting the gate electrode and the polysilicon layer to the gate line and the data line respectively are formed, and a metal material film serving as the data line 5 is formed of aluminum or the like as shown in FIG. 8I and patterned. Thereafter, a third interlayer film, a metal material serving as a black matrix, a fourth layer interlayer film and a transparent pixel electrode ITO are successively formed in this order.

The cross-sectional shapes as shown in FIGS. 6 and 10 is obtained through the above process. FIGS. 6 and 10 are cross-sectional views taken at the LDD portion of TFT (D–D' section) and at the channel portion of TFT (C–C' section) of FIG. 9. As shown in FIG. 6, the LDD region of TFT is covered by the contact holes, the back side light shielding film and the gate line. The back side light shielding film is connected to the gate line through the contact holes in the neighborhood of the side surface of the LDD region of TFT.

In this embodiment, the contact holes for connecting the gate line to the back side light shielding film are provided along the side surface of the LDD region of TFT as shown in FIG. 9, so that the LDD region of TFT is covered by the contact holes, the back side light shielding film and the gate line. Therefore, the direct light from the light source and the reflection light from the lens are prevented from being irradiated to the LDD region.

Further, since the back side light shielding film is connected to the gate line through the contact holes, the back side light shielding film serves to intercept light from the back surface of TFT and also serves as a gate wire, whereby the wire resistance of the gate line can be reduced.

The LDD portion of the pixel TFT is the most sensitive portion to light, and thus only the suppression of light incident to LDD portion has an effect on optical leak of TFT. Therefore, the optical leak current of the pixel TFT can be reduced by intercepting light incident to LDD portion, whereby degradation in image quality due to the optical leak of TFT can be prevented.

Further, since the wire resistance of the gate wire can be reduced, the degradation in image quality due to delay of signals on the gate line can be also prevented.

Third Embodiment

Figure 12:
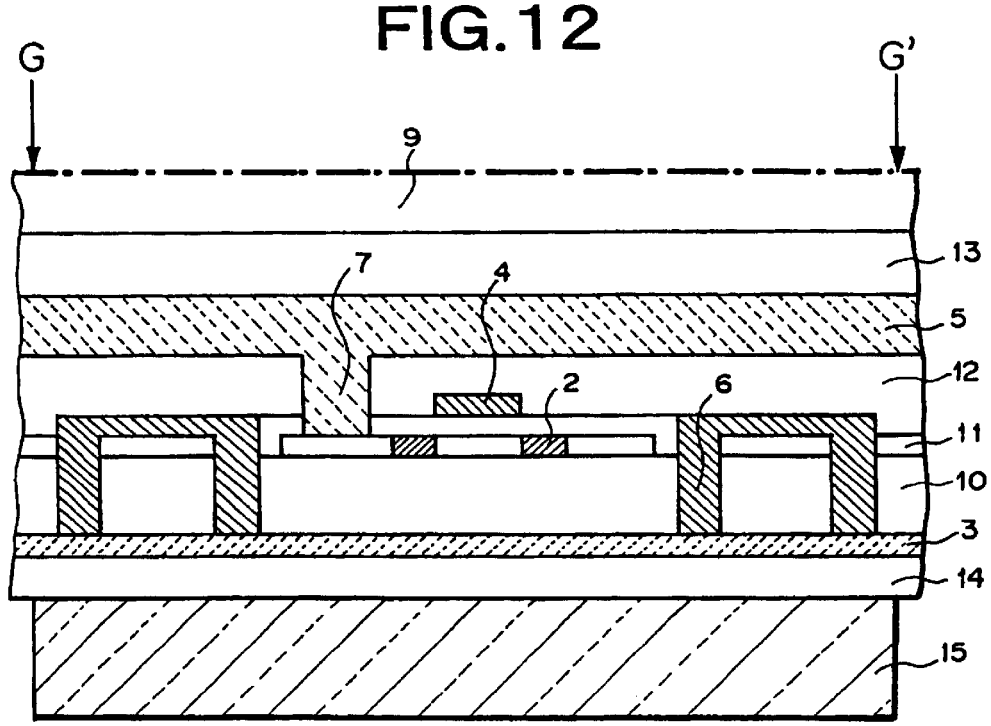
FIG. 12 is a cross-sectional view taken along a line G–G' of FIG. 11.

FIG. 11 is a plan view showing a pixel TFT portion of a liquid crystal light valve according to a third embodiment of the present invention, and FIG. 12 is a cross-sectional view taken along a line G–G' of FIG. 11. In FIGS. 11 and 12, when the function of the constituent member is the same as that of FIG. 5 to FIG. 7, the same sign is put.

In FIGS. 11 and 12, only the TFT portion of one pixel on the pixel board which is the feature portion of the present invention is illustrated. However, a plurality of pixels are arranged in a matrix form on the pixel board, and the pixel board thus constructed and a counter board having a counter electrode formed thereon are arranged so as to face each other through liquid crystal, thereby fabricating a liquid crystal light valve.

The manufacturing flow until the data line is formed is shown in FIGS. 13A to 13H. The manufacturing flow will be described with reference to FIGS. 13A to 13H.

Figure 13A:
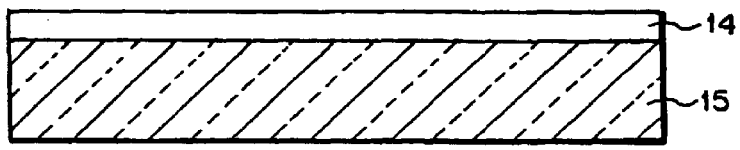
FIGS. 13A to 13H are cross-sectional views showing a manufacturing flow until a data line forming step of the pixel TFT portion according to the third embodiment of the present invention.
Figure 13B:
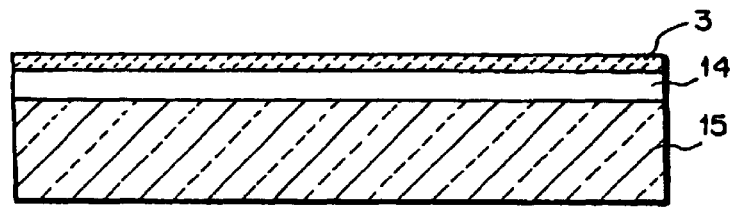
Figure 13C:
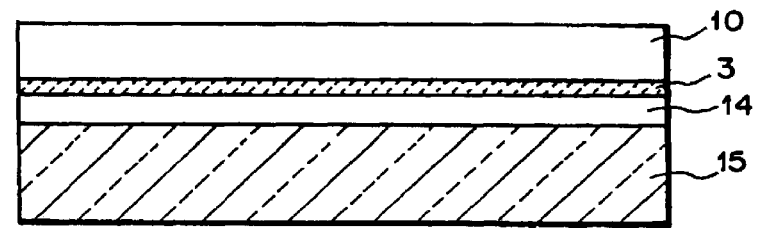
Figure 13D:
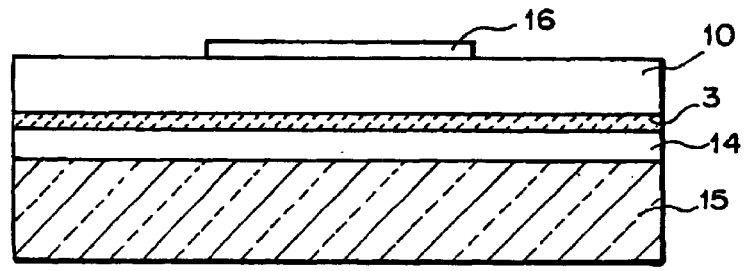
Figure 13E:
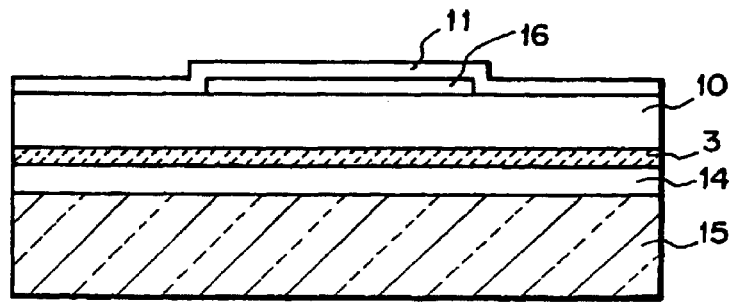

As shown in FIG. 13A, ground film (ground insulating film) 14 of $SiO_2$ or the like is formed on glass substrate 15 to prevent contamination of impurities from the glass. Thereafter, a back side light shielding film 3 of TFT is formed on the ground film 14 as shown in FIG. 13B. Any material may be used for the back side light shielding film 3, however, a material having high resistance to heat such as WSi or the like is preferably used because an annealing treatment is carried out when polysilicon is formed. Subsequently, first interlayer film 10 of $SiO_2$ or the like is formed on the back side light shielding film 3 as shown in FIG. 13C. The first interlayer film 10 is designed so as to have such a thickness that the back side light shielding film 3 does not act as a back gate of TFT. Subsequently, polysilicon layer 16 is formed as shown in FIG. 13D. After an amorphous silicon layer is formed, a laser annealing treatment is carried out, and a photolithographic step and an etching step are executed to form the polysilicon layer 16. Subsequently, gate insulating film 11 is formed so as to cover the polysilicon layer 16 as shown in FIG. 13E.

Figure 13F:
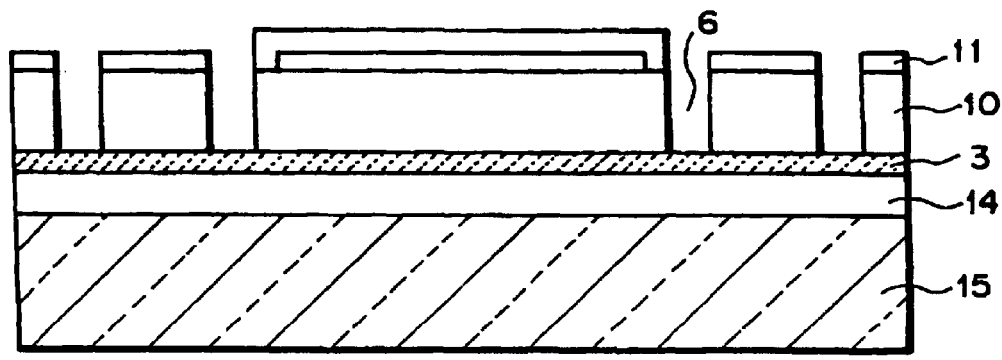
Figure 13G:
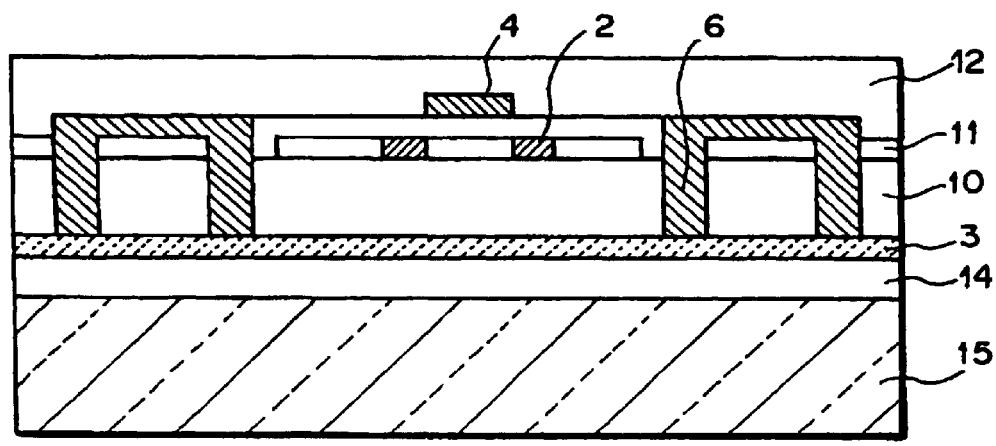

Subsequently, contact holes (contacts) 6 are formed along the data line as shown in FIG. 13F, the contact holes 6 may be formed at any positions insofar as they are located below the data line, however, it is preferable that they are near to the source region and the drain region in order to enhance the light shielding performance. Further, a metal film of WSi or the like which will serve as gate line 4 is formed as shown in FIG. 13G. Therefore, the gate metal film is embedded in the contact holes 6 formed below the data line.

Figure 13H:
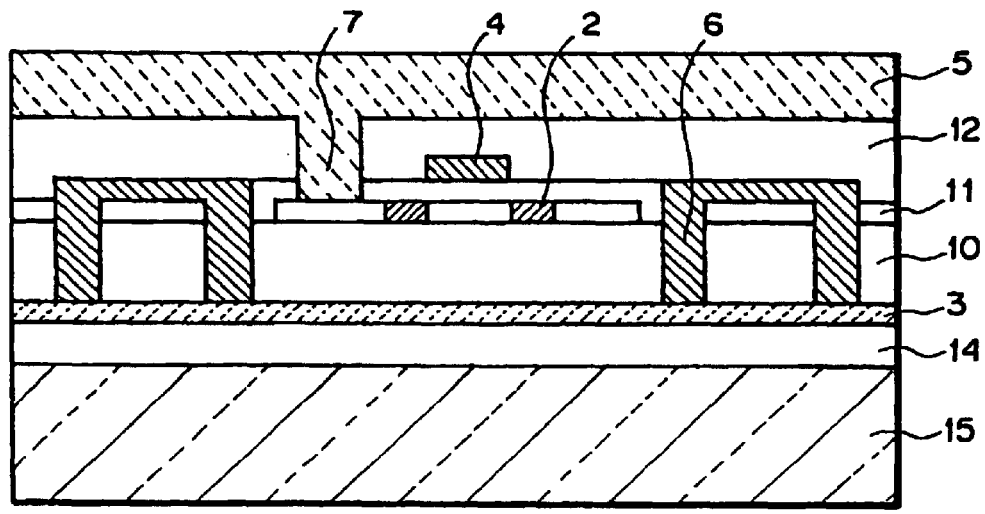

Thereafter, impurities are doped to form a source region, a drain region and LDD region. Subsequently, second interlayer film 12 is formed as shown in FIG. 13H. Thereafter, contact holes for connecting the gate electrode and the polysilicon layer to the gate line and the data line respectively are formed, and a metal material film of aluminum or the like which will serve as the data line 5 is formed and then patterned. Thereafter, third interlayer film 13, metal material film 9 serving as a black matrix, a fourth interlayer film and a transparent pixel electrode ITO are successively formed in this order.

The cross-sectional shape of FIG. 12 is obtained through the above process. FIG. 12 is a cross-sectional view taken along a line G–G' of FIG. 11. As shown in FIG. 12, the contact holes 6 and the gate electrode 4 embedded therein are provided below the data line.

In the first and second embodiments, light incident from the right and left sides of the LDD region can be intercepted, however, light incident along the data line cannot be intercepted. However, according to the third embodiment, the light propagating along the data line can be intercepted by the contact holes provided below the data line as shown in FIG. 11, whereby the optical leak current of the pixel TFT can be reduced as in the case of the first and second embodiments. Accordingly, the degradation in image quality due to the optical leak of TFT can be prevented.

Further, according to this embodiment, the contact holes are provided only below the data line, however, the contact holes may be also provided in the neighborhood of the side surface of TFT as in the case of the first and second embodiments. Therefore, the light propagating from the side surface and the light propagating along the data line can be intercepted, thereby further enhancing the light shielding effect.

Next, the construction of a liquid crystal projector apparatus using the liquid crystal light valve (liquid crystal panel) of the present invention will be described. The basic construction of the liquid crystal projector apparatus is disclosed in Japanese Laid-open Patent Application No. Hei-11-337900.

Figure 14:
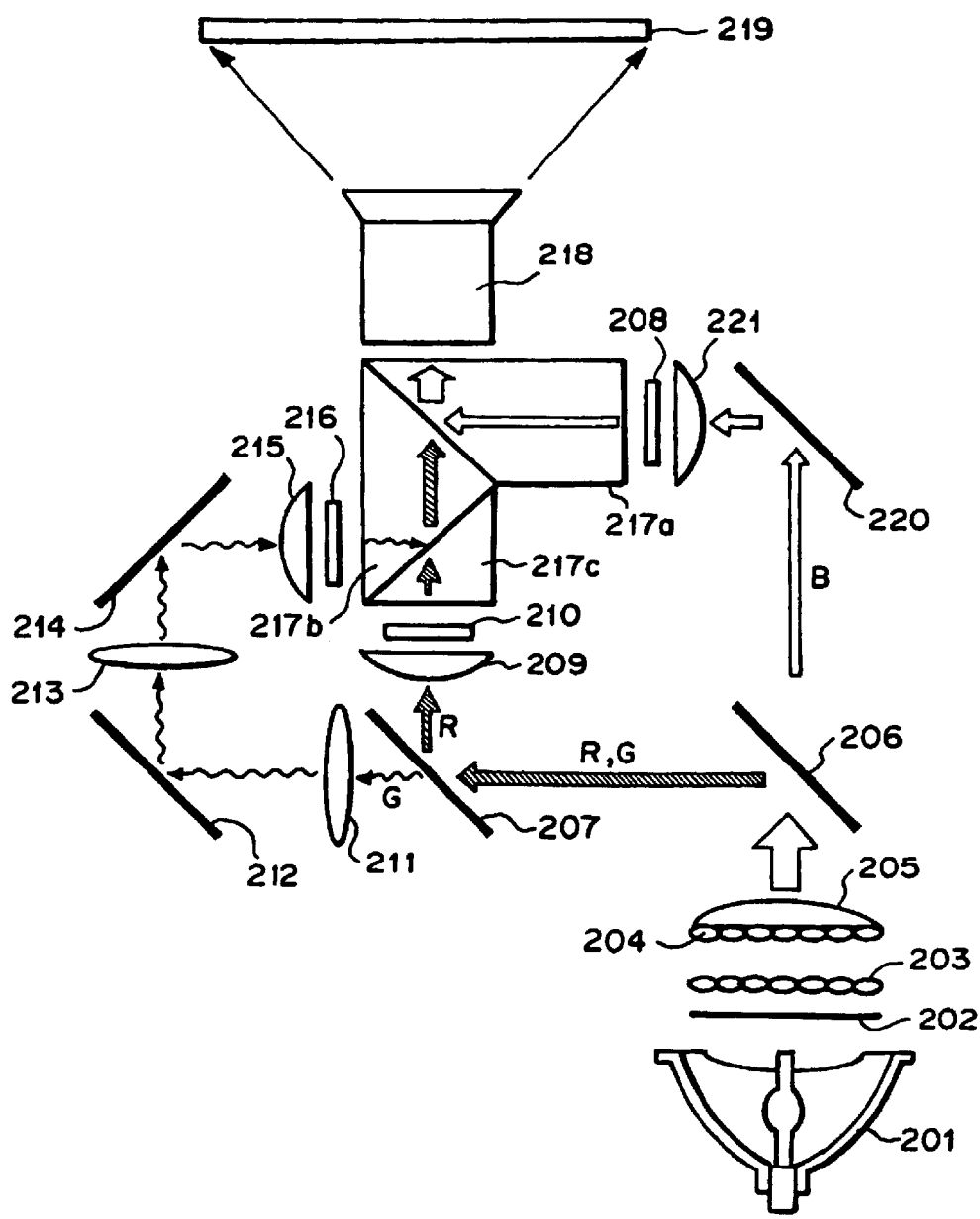
FIG. 14 is a diagram showing the construction of a liquid crystal projector apparatus according to the present invention.

FIG. 14 shows the construction of the liquid crystal projector apparatus according to the present invention.

In FIG. 14, light irradiated from lamp 201 is passed through UV-IR cut filter 202, multi-array lenses 203, 204 and a plane-convex lens 205, and then incident to dichroic mirror 206 so that it is separated into the combination of red light R and green light G, and blue light B. Further, the combination of red light R and green light G is separated into red light R and green light G by dichroic mirror 207.

The blue light B thus separated is passed through mirror 220 and condenser lens 221 and guided to liquid crystal panel 208 for blue. The red light R thus separated is passed through condenser lens 209 and guided to liquid crystal panel 210 for red. The green light G thus separated is passed through relay lens 211, mirror 212, relay lens 213, mirror 214 and condenser lens 215 and then guided to liquid crystal panel 216. The liquid crystal display device of the present invention is used as the liquid crystal panels 208, 210 and 216. That is, each of the liquid crystal panels used in the liquid crystal projector apparatus is obtained by sealing liquid crystal in the gap between the TFT board formed in the first, second or third embodiment and the counter board.

Light beams of three colors (R,G,B) which have been optically modulated by the liquid crystal panels 208, 210 and 216 are combined by a substantially L-shaped prism device comprising prism members 217a, 217b and 217c, and projected to screen 219 by projection lens 218.

The liquid crystal projector apparatus described above is designed as a three plate type, however, the present invention may be applied to a single plate type of liquid crystal projector apparatus.

The liquid crystal display device of the present invention is suitably applied to a liquid crystal light valve for use in a liquid crystal projector apparatus, however, it is not limited to the liquid crystal light valve. Further, the present invention may be applied to a case where an electric field effect transistor having no LDD region is used.

As described above, according to the present invention, the light incident to the channel region or/and the LDD region can be suppressed. Accordingly, the optical leak current of the pixel transistor can be reduced. Therefore, reduction in contrast due to optical leak current and degradation in image quality due to flicker or the like can be prevented.

Further, since the wire resistance of the gate wire can be reduced, degradation in image quality due to delay of signals on the gate wire can be prevented.

What is claimed is:

1. A liquid crystal display device, comprising:
a light shielding film formed on a pixel board;
a first insulating film formed on said light shielding film;
a semiconductor layer formed on said first insulating film;
a second insulating film, serving as a gate insulating film, formed on said semiconductor layer and said first insulating film; and
a gate line formed on said second insulating film,
wherein said semiconductor layer comprises a source region, a drain region, a channel region and a lightly doped drain (LDD) region; and
contact holes for connecting said gate line with said light shielding film that are formed on opposing sides of said channel region and said LDD region,
wherein a part of said gate line is filled up in said contact holes, and long sides of said contact holes have a length equal to or greater than a total length of a longside of said channel region and said LDD region.

2. A liquid crystal display device, comprising:
a light shielding film formed on a pixel board;
a first insulating film formed on said light shielding film;
a semiconductor layer formed on said first insulating film;
a second insulating film, serving as a gate insulating film, formed on said semiconductor layer and said first insulating film; and
a gate line formed on said second insulating film,
wherein said semiconductor layer comprises a source region, a drain region, a channel region and a lightly doped drain (LDD) region; and
contact holes for connecting said gate line with said light shielding film that are formed on opposing sides of said LDD region,
wherein a part of said gate line is filled up in said contact holes, and long sides of said contact holes have a length equal to or greater than a length of a long side of said LDD region.

3. The liquid crystal display device as claimed in claim 1, wherein at least said channel region is covered with said contact holes, said gate line, and said light shielding film.

4. The liquid crystal display device as claimed in claim 1, wherein said LDD region is covered with said contact holes and said light shielding film.

5. The liquid crystal display device as claimed in claim 2, wherein said LDD region is covered with said contact boles and said light shielding film.

6. The liquid crystal display device as claimed in claim 1, wherein said light shielding film comprises a conductive material.

7. The liquid crystal display device as claimed in claim 2, wherein said light shielding film comprises a conductive material.

8. The liquid crystal display device as claimed in claim 1, wherein said light shielding film comprises a heat-resistant material.

9. The liquid crystal display device as claimed in claim 2, wherein said light shielding film comprises a heat-resistant material.

10. The liquid crystal display device as claimed in claim 1, wherein said first insulating film has a thickness such that the light shielding film does not function as a back gate of a thin film transistor.

11. The liquid crystal display device as claimed in claim 2, wherein said first insulating film has a thickness such that the light shielding film tat does not function as a back gate of a thin film transistor.

12. The liquid crystal display device as claimed in claim 1, further comprising:
a third insulating film formed on said gate line; and a data Line formed on said third insulating film,
wherein a set of light shield holes is formed below said data line.

13. The liquid crystal display device as claimed in claim 2, further comprising:
a third insulating film formed on said gate line; and
a data line formed on said third insulating film,
wherein a set of light shield holes is formed below said data line.

14. The liquid crystal display device as claimed in claim 1, wherein distal ends of the length of each contact hole extend proximate to distal ends of the total length of said channel region and said LDD region.

15. The liquid crystal display device as claimed in claim 14, wherein the distal ends of the length of each contact hole extend beyond the distal ends of the total length of said channel region and said LDD region.

16. The liquid crystal display device as claimed in claim 2, wherein distal ends of the length of each contact hole extend proximate to distal ends of the length of said LDD region.

17. The liquid crystal display device as claimed in claim 16, wherein the distal ends of the length of each contact holed extend beyond the distal ends of the length of said LDD region.

18. A liquid crystal projector apparatus, comprising:
a liquid crystal display device including:
a light shielding film formed on a pixel board;
a first insulating film formed on said light shielding film;
a semiconductor layer formed on said first insulating film;
a second insulating film, serving as a gate insulating film, formed on said semiconductor layer and said first insulating film; and
a gate line formed on said second insulating film,
wherein said semiconductor layer comprises a source region, a drain region, a channel region and a lightly doped drain (LDD) region; and
contact holes for connecting said gate line wit said light shielding film that are formed on opposing sides of said channel region and said LDD region,
wherein a part of said gate line is filled up in said contact holes, and long sides of said contact holes have a length equal to or greater than a total length of a long side of said channel region and said LDD region;
a light source for irradiating light to said liquid crystal display device;
an optical system for guiding the light from said light source to said liquid crystal display device; and
an optical system for projecting information light from said liquid crystal display device.

19. A liquid crystal projector apparatus, comprising:
a liquid crystal display device including:
a light shielding film formed on a pixel board;
a first insulating film fanned on said light shielding film;
a semiconductor layer formed on said first insulating film;
a second insulating film, serving as a gate insulating film, formed on said semiconductor layer and said first insulating film; and
a gate line formed on said second insulating film;
wherein said semiconductor layer comprises a Source region, a drain region, a channel region and a lightly doped drain (LDD) region; and
contact holes for connecting said gate line with said light shielding film that are formed on opposing sides of said LDD region,
wherein a part of said gate line is filled up in said contact holes, and long sides of said contact holes have a length equal to or greater than a length of a long side of said LDD region;
a light source for irradiating light to said liquid crystal display device;
an optical system for guiding the light from said light source to said liquid crystal display device; and
an optical system for projecting information light from said liquid crystal display device.

* * * * *